US007720930B2

(12) United States Patent
Minturn

(10) Patent No.: US 7,720,930 B2
(45) Date of Patent: May 18, 2010

(54) SYSTEMS AND METHODS USING NIC-BASED PREFETCHING FOR HOST TCP CONTEXT LOOKUP

(75) Inventor: David B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1815 days.

(21) Appl. No.: 10/748,415

(22) Filed: Dec. 30, 2003

(65) Prior Publication Data
US 2005/0198400 A1 Sep. 8, 2005

(51) Int. Cl.
G06F 15/16 (2006.01)
(52) U.S. Cl. ........................ 709/217; 711/137
(58) Field of Classification Search ................ 709/250, 709/216, 217; 711/216, 217, 137
See application file for complete search history.

(56) References Cited

U.S. PATENT DOCUMENTS

| 5,860,144 | A  | * | 1/1999  | Frank et al.      | 711/206 |
| 6,230,231 | B1 | * | 5/2001  | DeLong et al.     | 711/3   |
| 6,393,544 | B1 | * | 5/2002  | Bryg et al.       | 711/220 |
| 6,393,545 | B1 | * | 5/2002  | Long et al.       | 712/34  |
| 6,424,650 | B1 | * | 7/2002  | Yang et al.       | 370/390 |
| 6,430,670 | B1 | * | 8/2002  | Bryg et al.       | 711/216 |
| 6,434,620 | B1 | * | 8/2002  | Boucher et al.    | 709/230 |
| 6,442,617 | B1 | * | 8/2002  | Lowe et al.       | 709/250 |
| 6,591,302 | B2 | * | 7/2003  | Boucher et al.    | 709/230 |
| 6,594,665 | B1 | * | 7/2003  | Sowa et al.       | 707/10  |
| 6,611,870 | B1 | * | 8/2003  | Asano et al.      | 709/238 |
| 7,174,393 | B2 | * | 2/2007  | Boucher et al.    | 709/250 |
| 2003/0208599 | A1 | * | 11/2003 | Asano et al.   | 709/226 |
| 2004/0123069 | A1 | * | 6/2004  | Franaszek et al. | 711/206 |
| 2004/0153578 | A1 | * | 8/2004  | Elzur          | 709/250 |
| 2007/0136495 | A1 | * | 6/2007  | Boucher et al. | 709/250 |

OTHER PUBLICATIONS

USENIX Association, Proceedings of HotOS IX: The $9^{th}$ Workshop on Hot Topics in Operating Systems / May 18-21, 2003, TCP Offload is a dumb Idea whose time has come, by Jeffrey C, Mogyl, Hewlett-Packard Laboratories.*

* cited by examiner

Primary Examiner—William C Vaughn, Jr.
Assistant Examiner—Scott Christensen
(74) Attorney, Agent, or Firm—Daly, Crowley, Mofford & Durkee, LLP

(57) ABSTRACT

Systems and methods using network interface card-based (NIC-based) prefetching for host TCP context lookup are disclosed. The process generally includes hashing, by the NIC, a packet received over the network, computing a host hash table cache line in a host memory using the hash value and using a hash table pages table containing host memory physical page addresses of a host hash table, and computing a host context table cache line in a host memory using the hash value and using a context table pages table containing host memory physical page addresses of a host context table. The NIC may be initialized with the hash table pages table and the context table pages table as well as with the a set number of hash node entries in the hash table of the host memory.

25 Claims, 5 Drawing Sheets

N number of hash nodes
X number of entries per hash node
Z number of entires in TCB context table Host TCP Data Structures

SYSTEMS AND METHODS USING NIC-BASED PREFETCHING FOR HOST TCP CONTEXT LOOKUP

BACKGROUND OF THE INVENTION

A network generally refers to computers and/or other device interconnected for data communication. A network interface controller (NIC) is a hardware device that connects a host computer system to a computer network such as a local area network (LAN). The NIC communicates with the host bus and is controlled by the host CPU in a manner similar to the way the host CPU controls an I/O device. Thus, the NIC appears as an I/O device to the host computer. To the network, the NIC can send and receive packets and appears as an attached computer.

NICs typically use descriptor rings for processing packets both in the receive direction and in the transmit direction. For example, when the NIC receives a packet or frame, the NIC reads a receive descriptor from the host system memory to determine where to place the data in the host system. After the data is moved to the host system main memory, the receive descriptor is written back out to the host system memory with status information about the received frame. In the transmit direction, the NIC operates in a similar fashion to the receive direction. In particular, the NIC is first notified by the host CPU of a new transmit. The NIC then reads the descriptor to locate the data, reads the data, and then writes the descriptor back with status about the transmit. On transmits, the NIC typically reads the next expected descriptor to see if any more data needs to be sent. As is evident, each receive or transmit frame results in at least three peripheral component interconnect (PCI) or peripheral bus reads or writes in addition to a status register read.

After the NIC receives and transfers the packet to the host computer, the host computer processes the packet through a protocol stack. During the host packet processing, the protocol header (e.g., transmission control protocol (TCP), Internet protocol (IP), Ethernet) is removed. The data portion is thus recovered and can be made available to a user, an application program, etc.

A non-insignificant amount of processing time is required for the host system to identify a TCP context due in part to memory access times. While the TCP context lookup may be offloaded to the NIC, such a mechanism requires significantly more NIC memory as well as elaborate communications between the NIC and the host to manage "statefull" memory on the NIC.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
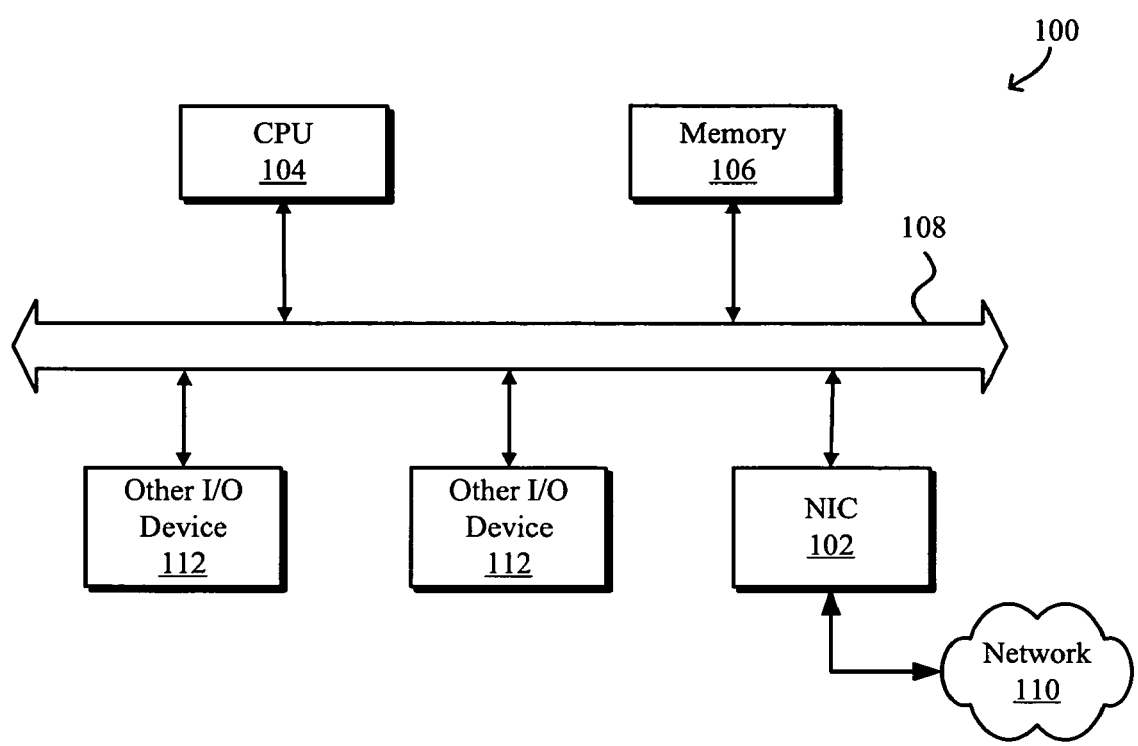
FIG. 1 is a block diagram of an illustrative host computer system with a network interface controller (NIC) for interfacing with a network.

Systems and methods using network interface card-based (NIC-based) prefetching for host TCP context lookup are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The process generally includes hashing, by the NIC, a packet received over the network, computing a host hash table cache line in a host memory using the hash value and using a hash table pages table containing host memory physical page addresses of a host hash table, and computing a host context table cache line in a host memory using the hash value and using a context table pages table containing host memory physical page addresses of a host context table. The NIC may be initialized with the hash table pages table and the context table pages table as well as with the a set number of hash node entries in the hash table of the host memory.

The NIC generally includes a hashing logic to generate a hashing value from a packet received over a network, a hash table pages table and a context table pages table for storing host memory physical page addresses of a host hash table and a host context table, respectively, and a cache line determinator configured to associate the hash value with a host hash table cache line and a host context table cache line in a host memory using the hash table pages table and the context table pages table, respectively.

A computer program product may also be implemented. The computer program product disposed on a computer readable medium to process packets, the program generally includes instructions for causing at least one processor to hash, by a NIC in communication with a host and the network, a packet received from the network, the packet having a context associated therewith to generate a hash value from context of the received packet, compute a host hash table cache line in a host memory using the hash value and using a hash table pages table containing host memory physical page addresses of a host hash table, and compute a host context table cache line in a host memory using the hash value and using a context table pages table containing host memory physical page addresses of a host context table.

These and other features and advantages of the present invention will be presented in more detail in the following detailed description and the accompanying figures which illustrate by way of example the principles of the invention.

FIG. 1 is a block diagram of an illustrative host computer system 100 with a network interface card (NIC) 102 for interfacing with a network 110 such as a local area network (LAN). The host computer system 100 also includes a CPU 104, memory 106, and other I/O devices 112 in addition to the NIC 102. The various components of the host computer system 100 communicate with each other over a host bus 108. The host computer system 100 generally refers to the computer system that processes the network protocol stack, e.g., transmission control protocol (TCP), Internet protocol (IP), Ethernet. The NIC 102 includes hash logic for performing hashing functions. A hash table or "hashing" is the creation of an index to the table content derived from a transformation of the information in the packet header A hash table or index of the stored information facilitates efficient searching of the information being stored.

Figure 2:
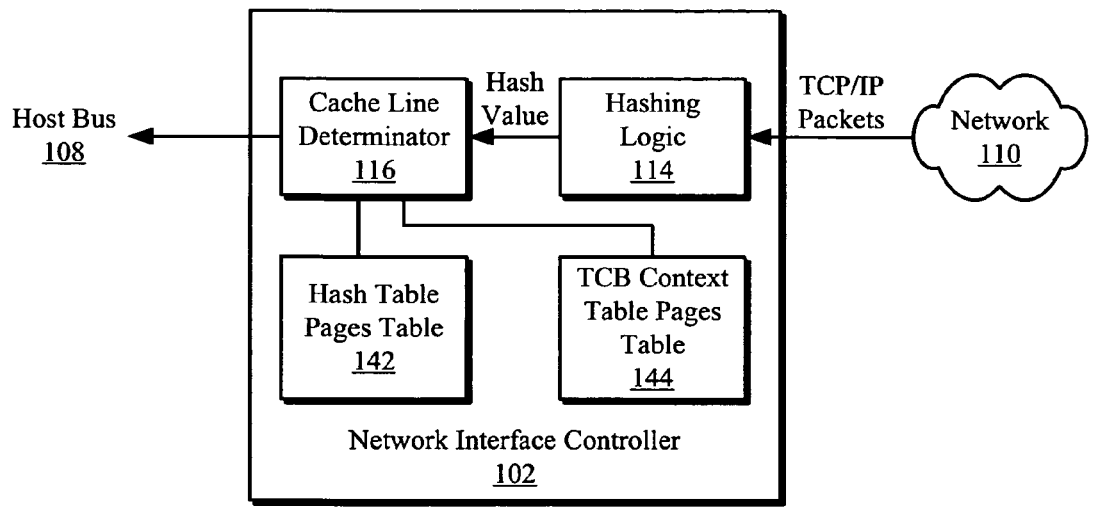
FIG. 2 is a block diagram illustrating the NIC in more detail.

FIG. 2 is a block diagram illustrating the NIC 102 in more detail. As shown, the NIC 102 receives TCP/IP packets from the network 110. Although not shown, the NIC 102 also forwards TCP/IP packets to the network 110. The MC includes a hashing logic 114 for performing hashing functions and a cache line determinator 116 for computing starting cache line locations in the host memory using the hash value as will be described in more detail below. The NIC 102 also includes a MC resident hash table pages table 142 (also referred herein as a hash tables pages table and hash table pages table) and a NIC resident TCB context table pages table 144 (also referred herein as a TCB context table pages table). The hash table pages table 142 and the TCB context table pages table 144 contain the physical page addresses of the host TCP hash table and host TCB context table, respectively. The tables 142, 144 may be pre-loaded into the NIC 102 by the host system upon system initialization.

Figure 4:
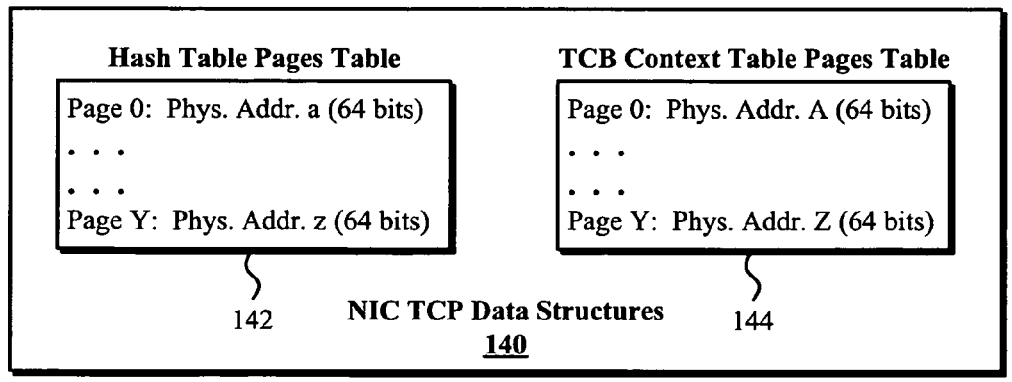
FIG. 4 illustrates NIC TCP data structures.
Figure 3:
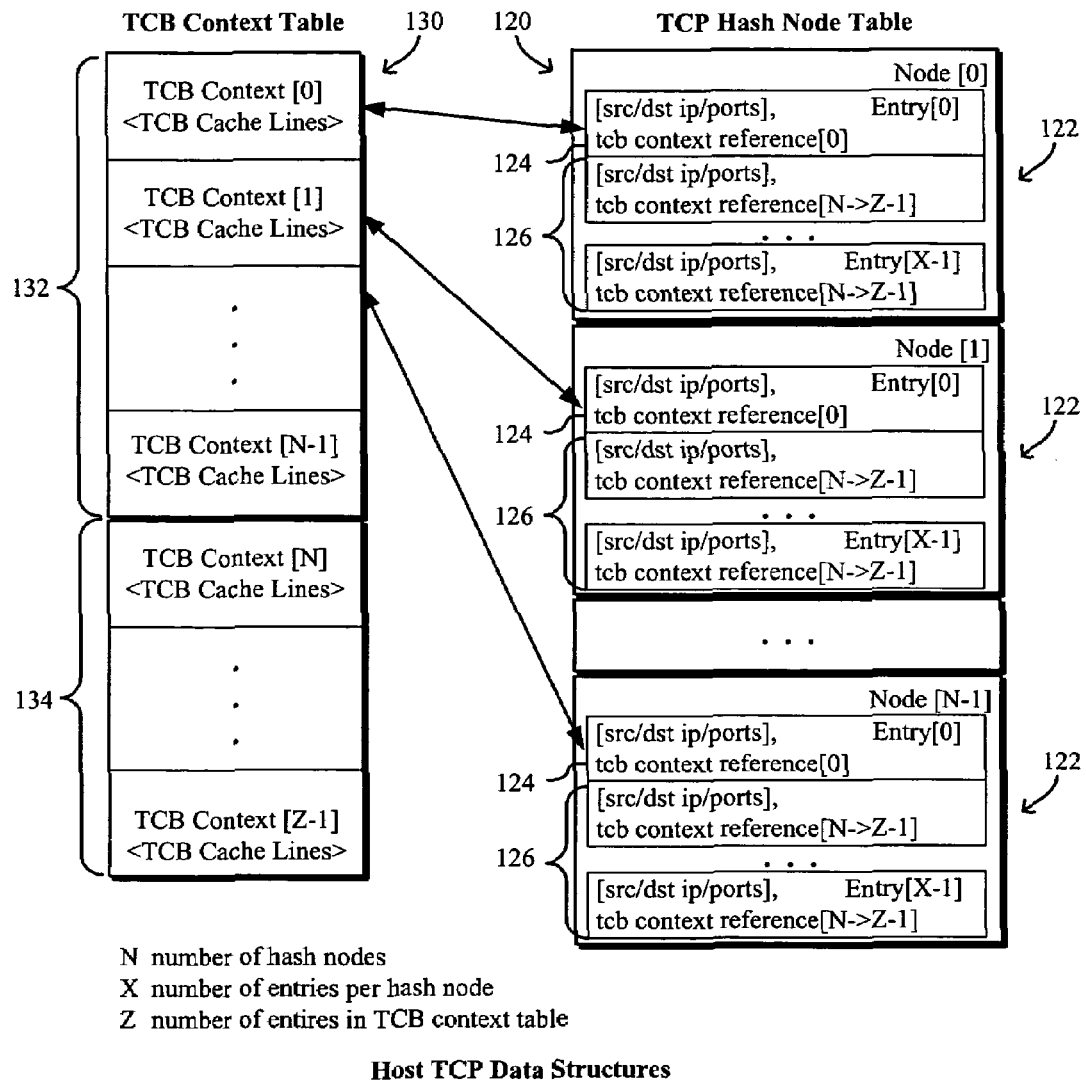
FIG. 3 illustrates host TCP data structures.

The host and MC TCP data structures are illustrated in FIGS. 3 and 4, respectively. As shown in FIG. 3, the host resident TCP data structures include a host hash node table 120 (also referred herein as a host hash node table) and a host TCP-controlled block (TCB) context table 130 (also referred herein as a host TCP context table). The host hash node table 120 is a data structure that contains multiple host TCP hash node entries 122.

The host hash node table 120 and the host TCB context table 130 may be located in contiguous virtual memory. The TCP host hash node table 120 and the host TCB context table 130 should be pre-pinned, i.e., pre-allocated in a known physical address space. These host tables can be configured to use any suitable memory page size such as 4K or 4 M size pages. A larger page size reduces the NIC memory requirements. The NIC is also initialized with the size of the host TCB context table entries and the host TCP hash table entries and page size.

The host hash node table 120 contains a set number (N) of TCP hash node entries 122 and a set number of contiguous cache lines. Each host TCP hash node entry 122 is a data structure containing one or more TCP context references 124, 126, i.e., TGP context identifier information values. Each TCP context reference 124, 126 includes source and destination IP addresses as well as the source and destination TCP ports. In the example shown in FIG. 3, each host TCP hash node entry 122 may contain up to X number of entries. Each host TCP hash node entry 122 can be one or more consecutive cache lines in size with each cache line containing multiple TCP context references 124, 126.

In sum, in the example shown in FIG. 3, there are N hash nodes, X entries per hash node, and Z entries in TCB context table. Merely as an example, there may be N=1600 hash nodes and X=8 entries per hash node for a total of up to Z=12,800 entries in TCB context table.

The other host resident data structure is the host TCB context table 130. The host TCB context table 130 is preferably a virtually contiguous data structure that contains the TCP context information, each entry corresponding to one of the TCB context references 124, 126. The host TCB context table 130 is preferably divided between a main host TCB context table 132 and a secondary host TCB context table 134. The main host TCB context table 132 preferably includes N entries corresponding to the first TCB context reference entries (entry[0]) 124 of the N node entries 122. The secondary host TCB context table 134 contains Z-N entries corresponding to all the remaining TCB context references 126 of the hash node entries 122.

For the NIC data structures shown in FIG. 4, the NIC TCP data structures 140 include a NIC resident hash table pages table 142 and a NIC resident TCB context table pages table 144. The NIC hash table pages table 142 is a table in NIC memory containing the physical address of each page of the host TCP hash node table (reference number 120 in FIG. 3). The NIC TCB context table pages table 144 is a table in NIC memory containing the physical address of each page of the host TCB context table (reference number 130 in FIG. 3). The NIC hash table pages table 142 and the NIC TCB context table pages table 144 have the same number of entries and each entry may be, for example, 64 bits wide.

The mechanism described herein has minimal memory requirements on the NIC. The host tables can be configured to use any suitable memory page size such as 4K or 4 M size pages. As noted above, a larger page size reduces the NIC memory requirements. For example, with a 4K byte page size, 512 byte context size, and a 64 bit address, approximately 8 bits of NIC memory space is needed per TCB entry. This is derived from (64 bit address/page)*(512 byte context size)/(4K byte/page). In contrast, with a 4 M page size, using the same derivation, only 0.008 bits of NIC memory space is needed per TCB entry.

Similarly, with a 4K byte page size, 64 byte hash nodes, and a 64 bit address, approximately 1 bit of NIC memory space is needed per hash node. This is derived from (64 bit address/page)*(64 byte hash node size)/(4K byte/page). In contrast, with a 4 M page size, using the same derivation, 0.001 bits of NIC memory space is needed per TCB entry.

Figure 5:
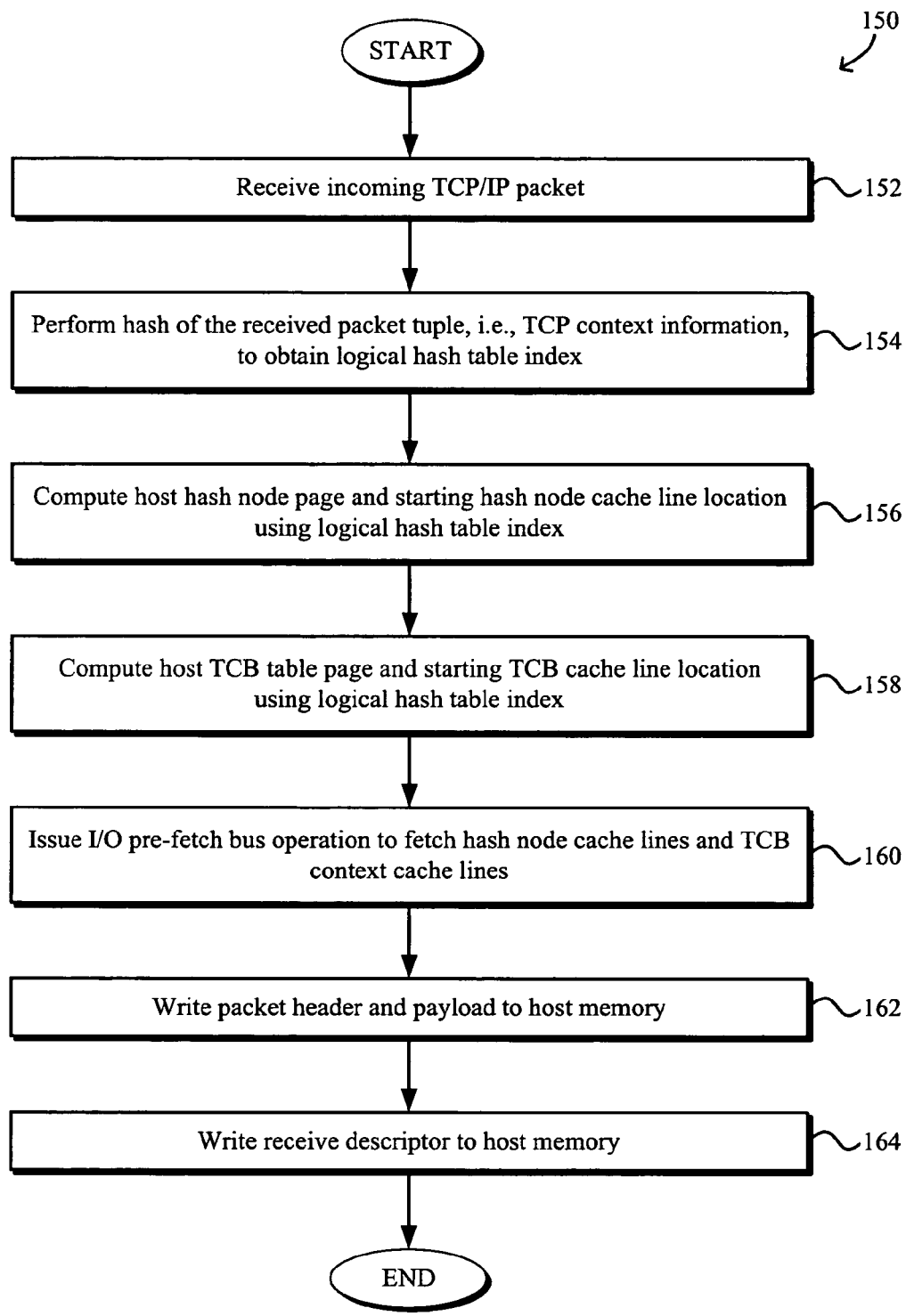
FIG. 5 is a flowchart illustrating a process for processing packets received by the NIC.

The general data structures of the host and the NIC having been presented, the process 150 for processing packets received by the NIC will now be described with reference to FIG. 5. It is noted that although not shown in FIG. 5, prior to processing any packets, the host system is initialized along with the NIC. Upon system initialization, the host resident software pre-loads the NIC TCP hash table pages table and the NIC TCB context table pages table containing the physical page addresses of the host TCP hash table and host TCB context table, respectively. These tables can be configured to use any suitable memory page size such as 4K or 4 M size pages. A larger page size reduces the NIC memory requirements. The NIC is also initialized with the size of the host TCB context table entries and the host TCP hash table entries.

The process 150 for processing packets received by the NIC begins when the NIC receives an incoming TCP/IP packet 152. The NIC performs a hash of the received packet tuples 154, i.e., the TCP connection identification information, to obtain a logical hash table index. The TCP context information includes the IP source and destination addresses and the TCP source and destination ports. The hash table index serves as an index to the NIC hash table pages table and to the TCB context table pages table.

The NIC then calculates the starting cache line locations in both the host hash node table and the host TCB context table by using calculated hash table index, i.e., the hash value, as an index into the NIC hash table pages table and the NIC TCB context table pages table. These starting cache line locations are referred to as host hash node table prefetch and the host TCB context table prefetch.

Specifically, the NIC computes the hash node page and the starting hash node cache line location 156 using the logical table index derived in 154. Note that the physical address of the hash node page is obtained from the NIC hash table pages table (142 in FIG. 4). For example, the hash node page and the starting hash node cache line location (HN_CL) may be determined by:

hash node page=(index*size of hash node entry)/(page size); and

HN_CL=physical address of the hash node page+
offset of the logical table index within the hash node page Similarly, the NIC computes the TCB context table page and the starting TCB context cache line location 158 using the logical table index derived in 154. Note that the physical address of the hash node page can be obtained from the NIC hash table pages table (142 in FIG. 4). For example, the TCB context table page and the starting TCB context cache line location (TCB_CL) may be determined by:

TCB table page=(index*size of TCB context entry)/(page size); and

TCB_CL=physical address of the TCB context page+
offset of the logical table index within the TCB context page.

The NIC then issues an I/O prefetch bus operation to fetch hash node cache lines and TCB context cache lines 160. In particular, the starting cache line locations HN_CL in the host hash node table and TCB_CL in the host TCB context table are used for the host hash node table and TCB context prefetch operations. The HN_CL and TCB_CL give the host caching subsystem a hint as to where the target TCB context is stored. As noted above, only the first entry of each node in the host hash node table is stored in the main host TCB context table while the remainder of the entries are stored in the secondary host TCB context table. Thus, in a best case scenario, the target TCB context is stored in the main host TCB context table such that no further searching is needed in order to located the target TCB context. If the target TCB context is stored in the secondary host TCB context table, then some amount of additional searching would be performed.

After the I/O prefetch is issued, the NIC writes the packet header and payload into the host memory 162 along with the receive descriptor 164.

Figure 6:
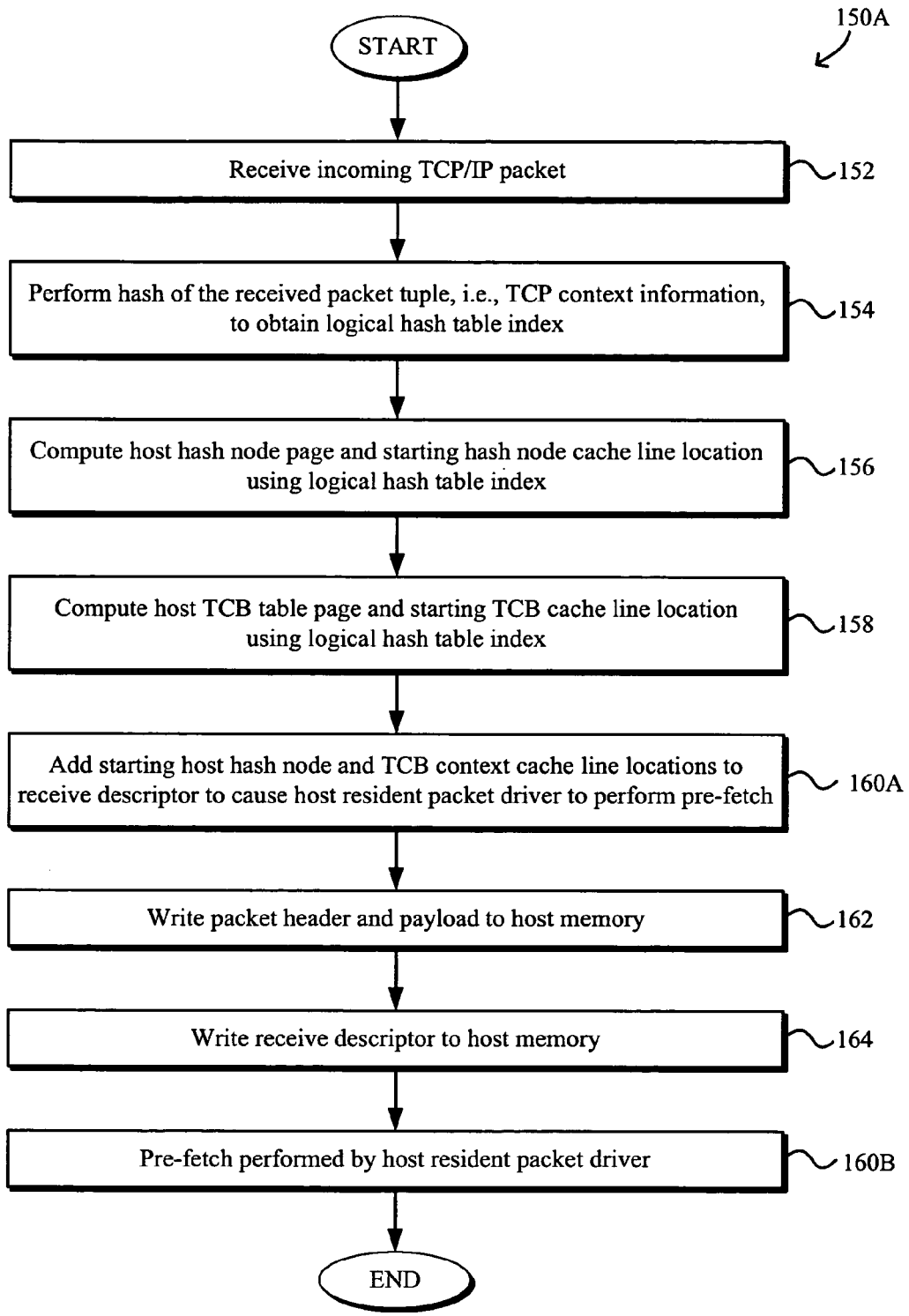
FIG. 6 is a flowchart illustrating an alternative process in which the host, rather than the NIC, performs the prefetch operations.

FIG. 6 is a flowchart illustrating an alternative process 150A in which the host, rather than the NIC, performs the prefetch operations. After the NIC determines the starting cache line locations in both the host hash node table and the host TCB context table 156, 158, the NIC may add the starting cache line locations in both the host hash node table (i.e., the host hash node table prefetch) and the host TCB context table (i.e., the host TCB context table prefetch) to the NIC receive descriptor that is associated with the packet received 160A. Then, after the NIC writes the packet header, packet payload, and receive descriptor to host memory 162, 164, the host resident packet driver issues software prefetch instructions using the host hash node table prefetch and the host TCB context table prefetch 160B. In particular, the host resident packet driver reads the NIC packet descriptor from the host memory and subsequently issue the processor prefetch commands using the host hash node table prefetch and the host TCB context prefetch as the cache line identifiers. In this embodiment, the cache line addresses passed by the NIC to the host NIC driver may be virtual addresses such that the NIC does not need to contain the two physical address translation tables, thereby simplifying the NIC requirements.

The above-described mechanism using NIC-based prefetching for host TCP context lookup provides several advantages. The mechanism facilitates in reducing the amount of processing time required by the host system to identify a TCP context as a result of reduced memory access times of accessing both the host TCP hash table and host TCP context. The mechanism also requires only one lookup for each TCP packet received. In addition, the mechanism is stateless in that once the NIC is initialized there is no additional communication required between the NIC and the host for purposes of the TCP context lookup. The mechanism has minimal memory requirements on the NIC. Thus, host TCP efficiency is increased as a result of reducing or minimizing the impact of memory latency on host TCB entry lookup, i.e., classification. Thus, the combination of the data structure layout of the host and the NIC, the NIC processing and lookup, and a host CPU or NIC prefetch functionality assists the host-based TCP processing stack.

While various embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A network interface controller, comprising:
a hashing logic to generate a hashing value from a packet received from a network including an index to a table content derived from a transformation of information in a header of the packet,
wherein the received packet has a context associated therewith;
a memory to store:
a hash table pages table to store a physical page address of a host hash table stored in a host memory of a host; and
a context table pages table to store a physical page address of a host context table in the host memory; and
a cache line determinator in communication with the host and the hashing logic, the cache line determinator being configured to:
determine a hash node page and a context table page corresponding to the hashing value;
lookup the physical address of the hash table page from the hash table pages table;
lookup the physical address of the context table page from the context table pages table;
determine the host hash cache line using the physical address of the hash table page and an offset of the hash value within the hash table page;
determine the host context cache line using the physical address of the context table page and an offset of the hash value within the context table page;
associate the hashing value with the host hash table cache line using the hash table pages table; and
associate the hashing value with the host context table cache line in the host memory using and the context table pages table.

2. The network interface controller of claim 1, wherein the hashing logic is configured to generate the hashing value from the context associated with the received packet.

3. The network interface controller of claim 1, wherein each entry in the hash table pages table and the context table pages table correspond to a page in the host memory, the host memory being in communication with the network interface controller.

4. The network interface controller of claim 1, wherein the cache line determinator is configured to:
   determine a hash node page and a context table page corresponding to the hash value;
   lookup the physical address of the hash table page from the hash table pages table;
   lookup the physical address of the context table page from the context table pages table;
   determine the host hash cache line using the physical address of the hash table page and an offset of the hash value within the hash table page; and
   determine the host context cache line using the physical address of the context table page and an offset of the hash value within the context table page.

5. The network interface controller of claim 1, wherein upon initialization, the network interface controller is configured with a set number of hash node entries in the hash table of the host memory.

6. The network interface controller of claim 1, wherein the network interface controller is configured to insert the host context table cache line and the host hash table cache line into a receive descriptor associated with the received packet and to output the receive descriptor to the host.

7. The network interface controller of claim 1 wherein a pre-fetch of the host context table cache line and the host hash table cache line is issued.

8. A network interface controller, comprising:
   a hardware card comprising:
      a hashing logic to generate a hashing value from a packet received from a network including an index to a table content derived from a transformation of information in a header of the packet,
         wherein the received packet has a context associated therewith;
      a cache line determinator in communication with the hashing logic, the cache line determinator being configured to:
         determine a hash node page and a context table page corresponding to the hashing value,
         lookup the physical address of the hash table page from the hash table pages table,
         lookup the physical address of the context table page from the context table pages table,
         determine the host hash cache line using the physical address of the hash table page and an offset of the hash value within the hash table page,
         determine the virtual host hash table cache line using the physical address of the context table page and an offset of the hash value within the context table page,
         associate the hashing value with the host hash table cache line using the hash table pages table; and
         associate the hash value with the virtual host hash table cache line and the virtual host context table cache line in a memory of the host of the network interface controller;
      wherein the network interface controller is configured to issue a pre-fetch of the host context table cache line and the host hash table cache line to the host.

9. The network interface controller of claim 8, wherein the hashing logic is configured to generate the hashing value from the context associated with the received packet.

10. A method for processing incoming packets from a network, comprising:
   hashing, by a network interface controller in communication with a host and a network,
      a packet received from the network,
         wherein the packet has a context associated therewith to generate a hash value from context of the received packet including an index to a table content derived from a transformation of information in a header of the packet;
   computing a host hash table cache line in a host memory of the host using the hash value and using a hash table pages table stored in a memory of the network interface controller and storing memory physical page addresses of a host hash table stored in the host memory of the host;
   computing a host context table cache line in the host memory using the hash value and using a context table pages table stored in a memory of the network interface controller and storing memory physical page addresses of a host context table stored in the host memory of the host; and
   issuing a pre-fetch of the host context table cache line and the host hash table cache line;
   wherein computing the host hash table cache line includes:
      determining a hash node page and a context table page corresponding to the hash value;
      looking up the physical address of the hash table page and the context table page from the hash table pages table and the context table pages table, respectively; and
      determining the host hash cache line and the host context cache line using the physical address of the hash table page and the context table page and an offset of the hash value within the hash table page and the context table page respectively.

11. The method of claim 10, wherein each entry in the hash table pages table and each entry in the context table pages table correspond to a page in the host memory.

12. The method of claim 10, further comprising initializing the network interface controller, the initializing including configuring the network interface controller with a fixed number of hash node entries in the hash table of the host memory.

13. The method of claim 12, the initializing further comprising loading a hash table pages table and a context table pages table.

14. The method of claim 10, further comprising:
   inserting the host context table cache line and the host hash table cache line into a receive descriptor associated with the received packet; and
   outputting the receive descriptor to the host.

15. The method of claim 10, further comprising: issuing a pre-fetch of the host context table cache line and the host hash table cache line.

16. A computer program product stored on a computer readable medium to process packets, the program including instructions for causing at least one processor to:
   hash, by a network interface controller in communication with a host and the a network, a packet received from the network, the packet having a context associated therewith to generate a hash value from context of the received packet including an index to a table content derived from a transformation of information in a header of the packet;
   compute a host hash table cache line in a host memory of the host using the hash value and using a hash table pages table stored in a memory of the network interface controller and storing physical page addresses of a host hash table stored in the host memory;

compute a host context table cache line in the host memory using the hash value and using a context table pages table stored in the memory of the network interface controller and storing physical page addresses of a host context table stored in the host memory; and issuing a pre-fetch of the host context table cache line and the host hash table cache line;

wherein the instructions to compute the host hash table cache line further include instructions for causing the at least one processor to:

determine a hash node page and a context table page corresponding to the hash value;

lookup the physical address of the hash table page and the context table page from the hash table pages table and the context table pages table, respectively; and determine the host hash cache line and the host context cache line using the physical address of the hash table page and the context table page and an offset of the hash value within the hash table page and the context table page, respectively.

17. The computer program product of claim 16, further comprising the instructions for causing at least one processor to:

insert the host context table cache line and the host hash table cache line into a receive descriptor associated with the received packet; and outputting the receive descriptor to the host.

18. The computer program product of claim 16, further comprising the instructions for causing at least one processor to:

issue a pre-fetch of the host context table cache line and the host hash table cache line.

19. A system, comprising:

a host CPU;

a host memory;

a network interface controller (NIC); and a host bus to facilitate the host CPU, host memory, and the NIC to communicate therebetween, wherein the NIC comprises:

a hashing logic to generate a hashing value from a packet received over a network including an index to a table content derived from a transformation of information in a header of the packet, the received packet having a context associated therewith;

a hash table pages table to store a physical page address of a host hash table stored in the host memory of the host CPU; and a context table pages table to store a physical page address of a host context table stored in the host memory of the host CPU; and a cache line determinator in communication with the host bus and the hashing logic, and wherein the cache line determinator is being configured to:

determine a hash node page and a context table page corresponding to the hashing value;

lookup the physical address of the hash table page from the hash table pages table;

lookup the physical address of the context table page from the context table pages table;

determine the host hash cache line using the physical address of the hash table page and an offset of the hash value within the hash table page;

determine the host context cache line using the physical address of the context table page and an offset of the hash value within the context table page;

associate the hashing value with the host hash table cache line using the hash table pages table; and associate the hashing value with the host context table cache line in the host memory using and the context table pages table.

20. The system of claim 19, wherein the host CPU is configured to issue a pre-fetch of the host context table cache line and the host hash table cache line.

21. The system of claim 19, wherein the hashing logic is configured to generate the hashing value from the context associated with the received packet.

22. The system of claim 19, wherein each entry in the hash table pages table and the context table pages table correspond to a page in the host memory, the host memory being in communication with the network interface controller.

23. The system of claim 19, wherein upon initialization, the network interface controller is configured with a set number of hash node entries in the hash table of the host memory.

24. The system of claim 19, wherein the network interface controller is configured to insert the host context table cache line and the host hash table cache line into a receive descriptor associated with the received packet and to output the receive descriptor to the host.

25. The system of claim 19, wherein the network interface controller is configured to issue a pre-fetch of the host context table cache line and the host hash table cache line.

* * * * *